J. T. McGRATH.
APPARATUS FOR RECLAIMING BOILER TUBES.
APPLICATION FILED MAR. 29, 1917.
1,293,836.
Patented Feb. 11, 1919.
2 SHEETS—SHEET 1.
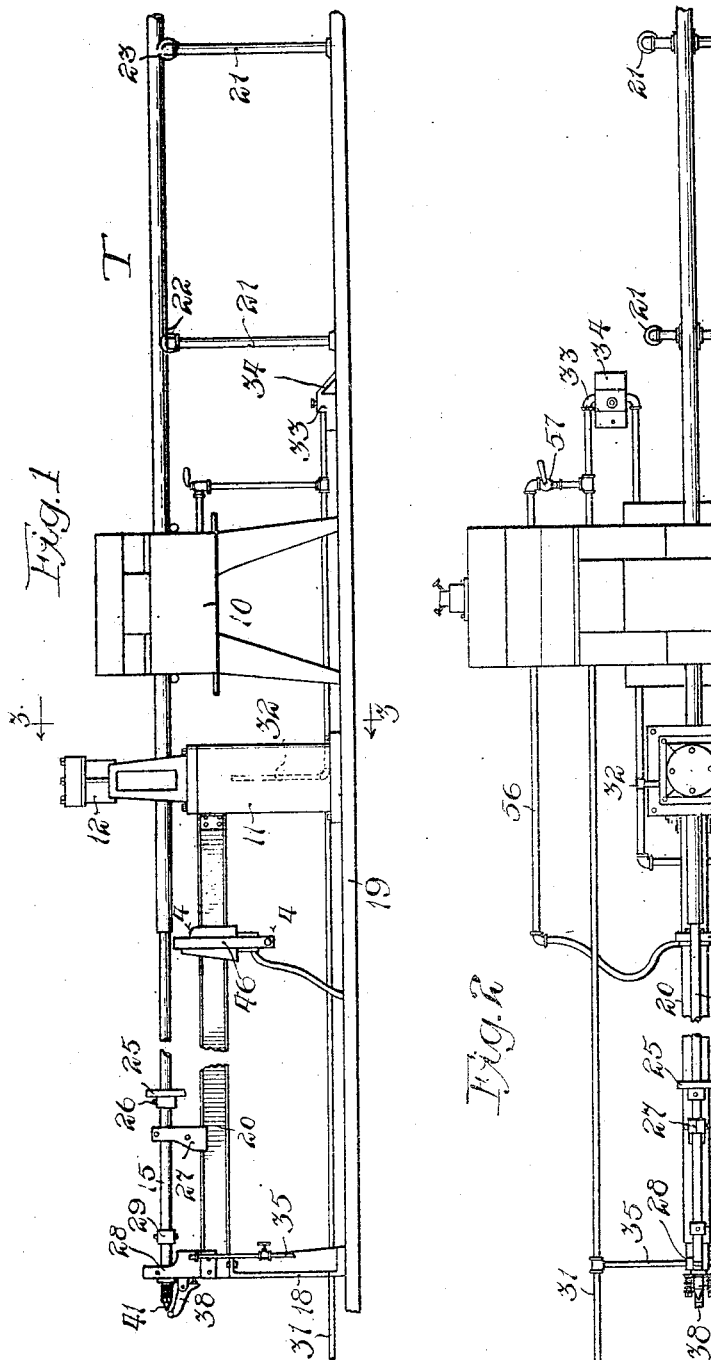

J. T. McGRATH.
APPARATUS FOR RECLAIMING BOILER TUBES.
APPLICATION FILED MAR. 29, 1917.
1,293,836.
Patented Feb. 11, 1919.
2 SHEETS—SHEET 2.
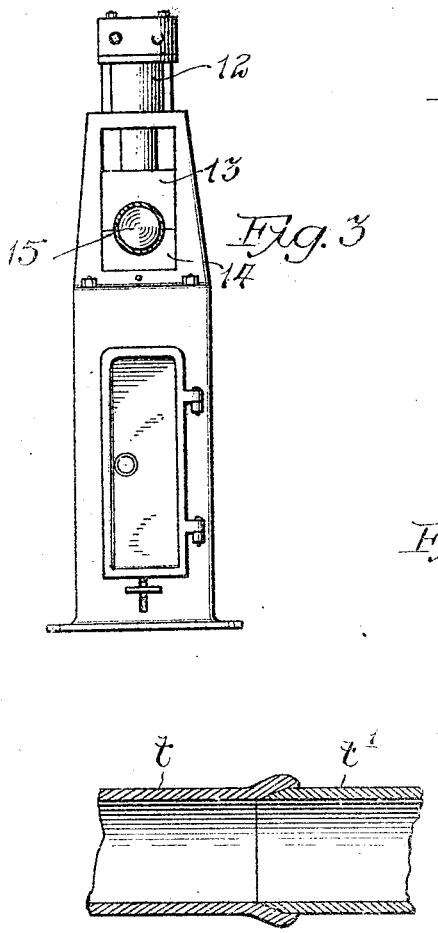
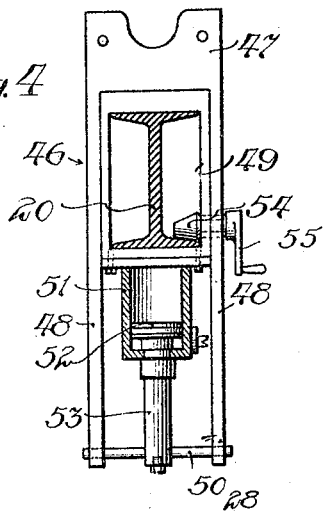
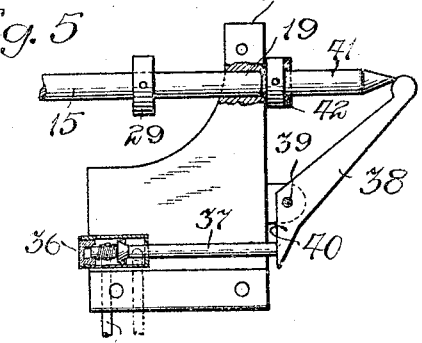
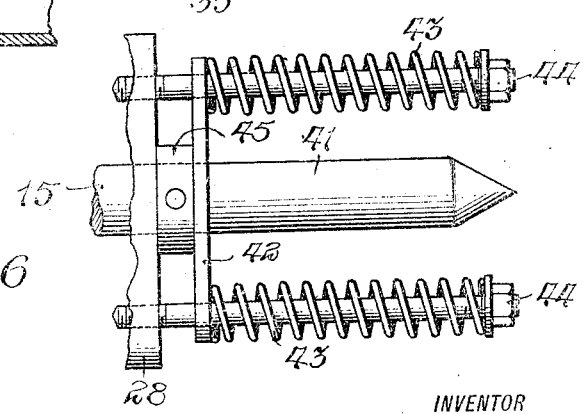
WITNESS
INVENTOR
John T. McGrath
By William L. Hale
ATTORNEY

UNITED STATES PATENT OFFICE.

JOHN T. McGRATH, OF BLOOMINGTON, ILLINOIS.

APPARATUS FOR RECLAIMING BOILER-TUBES.

1,293,836.  Specification of Letters Patent.  Patented Feb. 11, 1919.

Application filed March 29, 1917. Serial No. 158,304.

*To all whom it may concern:*

Be it known that I, JOHN T. MCGRATH, a citizen of the United States, and a resident of Bloomington, in the county of McLean and State of Illinois, have invented certain new and useful Improvements in Apparatus for Reclaiming Boiler-Tubes; and I do hereby declare that the following is a full, clear, and exact description thereof, reference being had to the accompanying drawings, and to the characters of reference marked thereon, which form a part of this specification.

This invention relates to a novel apparatus for reclaiming boiler tubes. It is primarily designed for use in railroad shops to permit the utilization of boiler tubes which would otherwise be scrapped.

Heretofore it has been the practice in removing boiler tubes for repair to cut off a short section of the tube at the flue sheet in order to effect the removal of the tube. After the tube has been repaired it is necessary to weld a "safe end" on the tube so that it will be long enough to again fit in its place in the boiler. These "safe ends" are made of different lengths, depending upon the number of times a tube has been repaired and other conditions, and after a tube has been repaired a number of times the number of welded joints in the tube become so great as to increase the risk of failure of the tube beyond accepted safety conditions; and this risk of failure is multiplied by the number of tubes in the boiler.

In the prior practice where a tube has thus been welded a large number of times and can not longer be used with safety, there has been no practical way of utilizing such portion of the tube as is sound and without faults. For instance, at least two-thirds of the tube may be sufficiently sound as to be used again, but no practical method has been developed for welding these long lengths of tubes to another length to make a tube of practical length for use. As a result, it has been the practice to scrap tubes which possess considerable potential value.

It is the purpose of my invention to provide an apparatus by which any practical length of tube may be welded to any other practical length of tube so that two lengths of "scrap" tube may be welded together to produce a good tube. In this way I have in practice been able to save many thousands of pounds of good tube stock from the "scrap" pile.

I have shown in the drawings one form of apparatus for practising my invention which has demonstrated its practicability in actual work, and will hereinafter describe the invention in connection with this particular embodiment. It is to be understood, however, that the invention is capable of assuming other structural forms within the spirit and scope thereof, and that the invention is not limited to the specific arrangement shown except as to claims wherein such specific arrangement is particularly pointed out or is imposed by the prior art.

An apparatus embodying my invention embraces, in general terms, a pneumatic welding machine, a welding furnace, such as an oil furnace, suitable straightening and storage racks and a mandrel on which the tube is placed while the operations are being carried on. The pneumatic welding machine is located closely adjacent to and in rear of the furnace and is lined up with the welding position of the tube in the furnace. The mandrel extends through the welding machine a short distance toward the furnace and extends forwardly from the welding machine in alinement with guides or rollers on the racks that hold the tube in position while being fed to the furnace. The mandrel is suitably supported and is provided with an adjustable stop or gage which is adapted to be shifted along the mandrel in different positions to correspond with the length of tube section to be welded on the tube.

In operation, one section of the tube is heated and belled out and the other section is scarfed and inserted therein. These sections thus connected are inserted over the mandrel until the point to be welded is properly located in the furnace. When the welding heat is attained the tube is pushed rearwardly through the furnace until the welding point is under the welding die when a stop, previously adjusted on the mandrel, may act automatically to start the hammer of the pneumatic welding machine. Alternatively the operation of the hammer may be started by manual power, or foot power, or both the manual and automatic control may be used in a single operation.

In the drawings:—

Figure 1 is a side elevation of a tube reclaiming apparatus embodying my invention.

Fig. 2 is a top plan view thereof.

Figs. 3 and 4 are sections on line 3—3 and 4—4, respectively, of Fig. 1.

Fig. 5 is a detail of the hammer controlling valve which is automatically operated by the work in the apparatus.

Fig. 6 is a detail of a resistance element hereinafter to be described.

Fig. 7 illustrates the bell and scarf of two tube sections ready for the welding heat.

As shown in said drawings, 10 designates a welding furnace of any approved type and which conveniently is an oil furnace. 11 designates a tube welding machine which embraces in its construction a pneumatic engine or motor 12, the piston of which operates a die 13 which coöperates with a fixed die 14 between which extends a mandrel 15. The particular construction of this pneumatic welding machine is not essential to the present invention and need not be herein more specifically described.

The mandrel 15 extends rearwardly from the welding machine and is supported at its extreme rear end on a standard 18 which rises from the general base 19 of the machine; or said parts may be fixed rigidly with respect to each other in a concrete base. As shown in Fig. 5 the mandrel enters a socket 19 formed in an upstanding bracket 28 rigid with standard 18. The said standard 18 may be connected rigidly to the welding machine 11 through the means of a horizontal I-beam 20 having an additional function hereinafter to be referred to.

21, 21 designate the standards of racks comprising also horizontal members 22 on which the tubes T are supported when being addressed to the machine, and said horizontal portions 22 are made of sufficient length to constitute storage or straightening racks. The racks are disposed principally at one side of the center of the machine and are provided with one or more grooved rollers 23 to maintain the tubes in the center line of the furnace and welding machine and to support the longer tube section while the sections are being heated and welded; the shorter section being supported by the mandrel 15.

25 designates a gage stop that is supported on the mandrel 15 and is adjustable therealong, being adapted to be locked thereto by a set screw 26. 27 designates a mandrel support which rises from the beam 20 for the purpose of supporting the mandrel between the welding machine and the standard 18. Said support is adjustably fixed in any suitable manner to the beam so that it may be moved in a direction endwise of the beam and mandrel. The mandrel is supported at its rearmost end upon the bracket 28 which rises from the beam 20 above the standard 18. As herein shown said mandrel has a limited end play in the socket, said end play being limited by a collar 29.

The hammer of the pneumatic welding machine is operated by air under pressure from any suitable source, delivered through a main or supply pipe 31 to an air inlet pipe 32 of the air motor for the welding hammer. The supply of air through said pipe to the welding machine may be either manually controlled or may be automatically controlled, the latter by the presence of the work in the machine. For hand or foot control any suitable form of valve 33 may be provided in the pipe between the source of supply and the air motor for the welding machine, and said valve may be equipped with a controlling foot pedal 34 that is located at the front of the furnace in convenient position for the operator to control it when standing alongside the racks to feed the tubes into the furnace and welding machine.

In addition, an automatic control may also be provided which may be operated independently of or in conjunction with the manual control. The automatic control mechanism may be adapted by providing a branch pipe 35 connected to the main air line, and directed to the inlet pipe 32 of the air motor of the welding machine. The said branch pipe 35 extends through or communicates with a control valve 36, shown in Fig. 5, that is mounted in the bracket 28. Said valve is controlled by a plunger 37 which in turn is actuated by means of a lever 38 that is pivoted at 39 to the bracket and has a short arm 40 which engages the outer end of the plunger. The said lever 38 extends rearwardly and upwardly from its pivot and is adapted to be engaged by a reciprocating member 41 that is carried by a cross piece 42 which is suitably mounted on the upstanding part of the bracket 28. Said member 41 is in line with the mandrel 15 and when the mandrel is pressed rearwardly it engages the actuating member 41 and forces it toward the lever 38. The end of said actuating member 41 is tapered so as to engage the lever 38 with a wiping contact when said member is forced rearwardly through endwise movement of the mandrel.

As shown in Fig. 6, and as preferably made, the valve actuating member 41 is restored to normal position after operating the valve 36 by means of springs 43, 43 which, as herein shown, surround studs 44, 44, one at each side of the actuating member 41, and are interposed between the cross bar 42 and nuts threaded on the rear ends of said studs. Said studs extend loosely through the cross bar 42 and are screw threaded into the bracket 28. A collar 45 limits movement of the operating member 41 toward said bracket. The springs 43 have another function which will be hereinafter described.

46 designates a pneumatic bumper which is supported on the beam 20 and rises therefrom and is adapted to be forced upwardly against the mandrel for engagement with the end of the "safe end" length of tube when the two lengths of tubes are in the heating position in the furnace. The said pneumatic bumper is shown most clearly in Figs. 1 and 4. It comprises an upper horizontal member 47 that is recessed to receive the mandrel, and spaced vertical arms 48, 48 that extend down along side the beam 20 and along side a frame 49 that is supported on said beam 20 and slidable longitudinally thereon. The lower ends of said arms, below the frame 49, are connected together by a tie member 50. 51 designates a cylinder which is fixed in any suitable manner to the frame 49 and 52 designates a piston therein, the rod or stem 53 of which is fixed to the tie member 50. When air is admitted to the cylinder beneath the piston the frame, comprising the members 47 and 48, is raised to bring the recessed part thereof up under and against the mandrel. When so raised the rearmost tube section or length may be bumped endwise against said bumper while the joint is at the welding heat in the furnace and thereby effect a good joining of the metal at the weld. The said pneumatic bumper is adapted to be shifted longitudinally of the beam 20 and may be locked thereto by a conical, rotative eccentric lock 54 that is provided with a hand lever 55. Air to actuate the pneumatic bumper is delivered thereto through a branch pipe 56 of the main air pipe 31 and said branch pipe is provided with a manually operable valve 57 located adjacent the valve 33 of the main pipe.

In the operation of the apparatus one tube section $t$ is heated and belled out in the usual way and the other or scarfed section $t'$ is inserted into the belled section $t$. The two tube sections thus joined are passed through the furnace, with the rear end of the rear tube section over the mandrel until the point of weld is in the proper place of heating in the furnace.

Just before the jointed tube sections are inserted on the mandrel to bring the joined ends thereof into heating position in the furnace, the pneumatic bumper is thrown upwardly against the mandrel 15 through the operation of the valve 57 of the branch air line 56. Said bumper is so adjusted on the mandrel that it serves as a stop to bring the joined ends of the tube sections into the proper place in the furnace for heating them; and the bumper serves as a fixed abutment against which the tube sections may be thrust endwise with sufficient force to press the heated metal of the two tube sections together during the heating operation.

When the proper temperature is reached the tube is shifted rearwardly through the furnace, after the bumper is lowered to bring the joined portions of the tubes to the proper point between the welding dies of the welding machine. The said rear tube section is arrested by the stop or gage 25 on the mandrel which acts to locate the welding point between the dies.

After adjusting the pneumatic bumper the gage stop 25 on the mandrel 15 is so adjusted that the distance between the face of the bumper and the face of the collar will equal the distance between the center of the welding dies and the heating point in the furnace, so that when the tube is shifted through the furnace to said dies and the tube comes into contact with the collar 25 the welding point will be accurately located between the welding dies.

When the apparatus is arranged to be automatically started in operation by the presence of the work in the apparatus the mandrel is given slight end play so that when the rear tube section of the tube strikes the stop gage the mandrel is shifted rearwardly and engages the operating member 41 of the valve 36 whereby air is admitted to the pneumatic welding machine to start the hammer of the machine in operation. When the automatic starting apparatus is employed and the work is finished the work is withdrawn to permit the automatic valve to close and stop the hammer. The springs 43 serve to interpose a resistance to the endwise movement of the tube on the mandrel in the event incrustation on the tube should tend to produce friction between the mandrel and tube such as would start the welding hammer in operation before the welding point reaches the welding position between the dies. If the automatic starting device be not employed air is admitted to the hammer, when the point of weld is between the dies, through the action of the pedal actuated valve 33. In some instances both the pedal actuated valve and the automatic valve may be used, the latter to initially start the hammer in operation and the former to operate the hammer after the work has been partially withdrawn so as to facilitate the withdrawal of the welded tube sections from the mandrel.

After the tubes have been welded they are drawn outwardly and placed on the storage or straightening racks 22 until cooled.

I claim as my invention:—

1. Means for welding tube sections together comprising heating means including dies and welding means, the latter located in the direct line of the heating means, whereby two joined tube sections may be shifted directly from the heating means to the welding means, and an axially movable mandrel associated with the welding means, combined with a stop on the mandrel for locating the welding point between the hammer dies of the welding means.

2. A tube welding apparatus, comprising an endwise displaceable mandrel over which the tube sections are passed, with means to support the mandrel, a welding furnace, and a welding machine in rear of the furnace, said mandrel extending between the dies of the welding machine and rearwardly a distance from said machine.

3. Means for welding tube sections together comprising heating means and welding means, the latter located in the direct line of the heating means, whereby two joined tube sections may be shifted directly from the heating means to the welding means, an endwise shiftable mandrel associated with the welding means, and means controlled by displacement of the mandrel to control the operation of the welding means.

4. A tube welding apparatus comprising a furnace, a welding machine in rear of the furnace, a mandrel over which the tube sections are passed and in line with the heating and welding positions of the furnace and welding machine, respectively, said mandrel having a limited endwise displacement, with means actuated by endwise displacement of the mandrel for controlling the operation of the welding machine.

5. A tube welding apparatus comprising a furnace, a welding machine in rear of the furnace, a mandrel over which the tube sections are passed and in line with the heating and welding positions of the furnace and welding machine, respectively, said mandrel having a limited endwise displacement, with means actuated by endwise displacement of the mandrel for controlling the operation of the welding machine, and a welding resistance means applied to the mandrel to yieldingly oppose endwise movement thereof.

6. A tube welding apparatus comprising a furnace, a welding machine in rear of the furnace, a mandrel over which the tube sections are passed and in line with the heating and welding positions of the furnace and welding machine, respectively, said mandrel being provided with a tube stop and being endwise displaceable, with means to limit its endwise movement, and means actuated by endwise movement of the mandrel to control the operation of the hammer of the welding machine.

7. A tube welding apparatus comprising a mandrel over which the tube sections are passed, with means to support it, a welding furnace, and a welding machine in rear of the furnace having dies, said mandrel extending between the dies of the welding machine and rearwardly a distance from said machine, and being in line with the welding position in said machine and the heating position in said furnace, and a bumper, having means by which it may be moved into contact with the mandrel to intercept the rear tube section and to be retracted from said mandrel.

8. A tube welding apparatus comprising a mandrel over which the tube sections are passed, with means to support it, a welding furnace and a welding machine in rear of the furnace having dies, said mandrel extending between the dies of the welding machine and rearwardly a distance from said machine, and being in line with the welding position in said machine and the heating position in said furnace, a bumper, having means by which it may be moved into contact with the mandrel to intercept the rear tube section, and means to support said bumper, embracing means to permit the bumper to be adjusted lengthwise of the mandrel.

9. A tube welding apparatus comprising a mandrel over which the tube sections are passed, with means to support it, a welding furnace, and a welding machine in rear of the furnace having dies, said mandrel extending between the dies of the welding machine and rearwardly a distance from said machine, and being in line with the welding position in said machine and the heating position in said furnace, a bumper, having means by which it may be moved into contact with the mandrel to intercept the rear tube section, there being a gage stop on said mandrel to limit endwise movement of the tube thereon, and means to adjust said stop along said mandrel.

10. An apparatus for welding tubes comprising a furnace, a welding machine in rear thereof, having welding dies in line with the heating position of the furnace, a mandrel extending rearwardly from the welding machine over which the tube sections are placed, a pneumatic bumper movable upwardly against the mandrel against which the advance section of the tube is engaged to adjust the joined ends of the tube to the heating position of the furnace, and a gage stop on the mandrel to adjust the tube sections to the welding position of the welding machine.

11. Tube welding apparatus comprising a furnace, a welding machine in rear thereof, a standard in rear of the welding machine, a beam connecting said welding machine and standard, a mandrel extending rearwardly from the welding machine and supported on said standard, a stop gage on said mandrel and a bumper on said beam movable toward and from the mandrel into and out of the path of the tube.

12. A tube welding machine for the purpose set forth comprising alined heating and welding means, with an axially alined mandrel, a gage stop on said mandrel, and a bumper, having means to support said bumper independently of said mandrel.

13. A tube welding machine for the purpose set forth comprising alined heating and welding means, with an axially alined mandrel, and a bumper reciprocable toward and from said mandrel for contact with one end of a tube section.

14. Means for welding tube sections together comprising heating means and welding means, the latter located in the direct line of the heating means, whereby two joined tube sections may be shifted directly from the heating means to the welding means, an endwise shiftable mandrel associated with the welding means over which the tube sections are passed, means controlled by endwise displacement of the mandrel to control the operation of the welding means, and manual means to also control the operation of said welding means.

15. A tube welding apparatus comprising heating means, welding means, a tube section supporting mandrel axially alined with the heating and welding means, and a bumper movable toward and from the mandrel against which one of the tube sections being welded may be bumped.

16. A tube welding apparatus comprising heating means, pneumatic welding means, with means to supply a motive fluid thereto, a tube section supporting mandrel axially alined with the heating and welding means, and a pneumatically actuated bumper connected to the source of supply of motive fluid and movable toward and away from the mandrel and against which one end of a tube section being welded may be bumped.

17. A tube welding apparatus comprising heating means, welding means, a tube section supporting mandrel axially alined with the heating and welding means, a bumper movable toward and from the mandrel against which one end of a tube section being welded may be bumped, and supporting means for said bumper constructed to admit adjustment of the bumper toward and from the welding means.

In witness whereof I claim the foregoing as my invention, I hereunto append my signature in the presence of two witnesses at Bloomington, Illinois, this 24th day of March 1917.

JOHN T. McGRATH.

Witnesses:
MARY C. GLEESON,
W. B. LEACH.

Copies of this patent may be obtained for five cents each, by addressing the "Commissioner of Patents, Washington, D. C."